United States Patent
Wingate

[11] Patent Number: 5,988,812
[45] Date of Patent: Nov. 23, 1999

[54] HEADPHONE EYEGLASSES

[75] Inventor: Richard Charles Wingate, Scarsdale, N.Y.

[73] Assignees: Sony Corporation, Tokyo, Japan; Sony Electronics, Inc., Park Ridge, N.J.

[21] Appl. No.: 08/958,448

[22] Filed: Oct. 27, 1997

[51] Int. Cl.[6] .............................. G02C 1/00; H04B 1/08
[52] U.S. Cl. ............................................ 351/158; 455/350
[58] Field of Search .................................. 351/158, 111, 351/118, 123; 381/370; 455/350, 351

[56] References Cited

U.S. PATENT DOCUMENTS

| | | | |
|---|---|---|---|
| 4,902,120 | 2/1990 | Weyer | 351/158 |
| 5,276,471 | 1/1994 | Yamauchi et al. | 351/158 |
| 5,406,037 | 4/1995 | Nageno | 381/129 |
| 5,420,935 | 5/1995 | Shinohara et al. | 381/183 |
| 5,519,782 | 5/1996 | Shinohara et al. | 381/183 |
| 5,606,743 | 2/1997 | Vogt et al. | 455/350 |
| 5,706,353 | 1/1998 | Arai et al. | 381/77 |

*Primary Examiner*—Huy Mai
*Attorney, Agent, or Firm*—Ronald P. Kananen; Rader, Fishman & Grauer

[57] ABSTRACT

A combination is provided which includes one or more headphones, a pair of eyeglasses, and a device which connects the eyeglasses and the one or more headphones. The combination may be provided as a self contained unit, which may also include a coiling device for an attached sound transmission coil. Alternatively, the headphones may be used in combination with other eyeglasses. A method is also provided for using the combination.

20 Claims, 2 Drawing Sheets

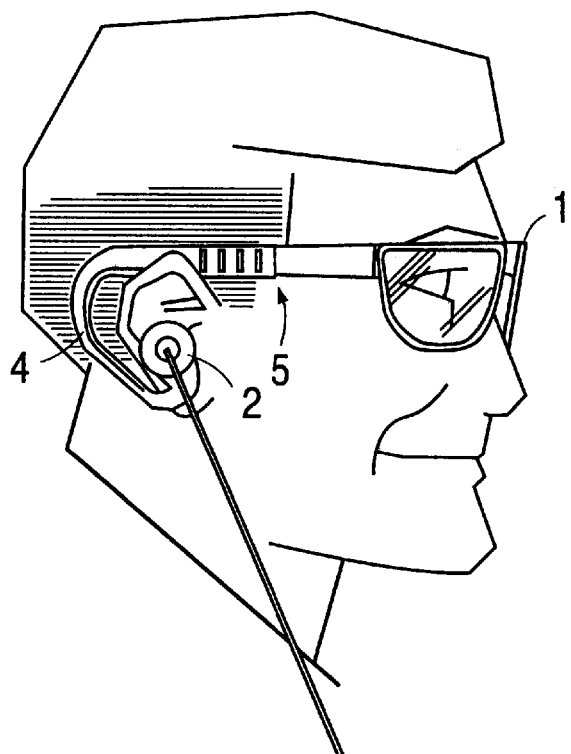
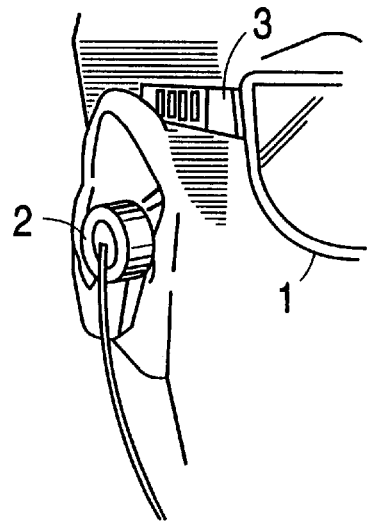
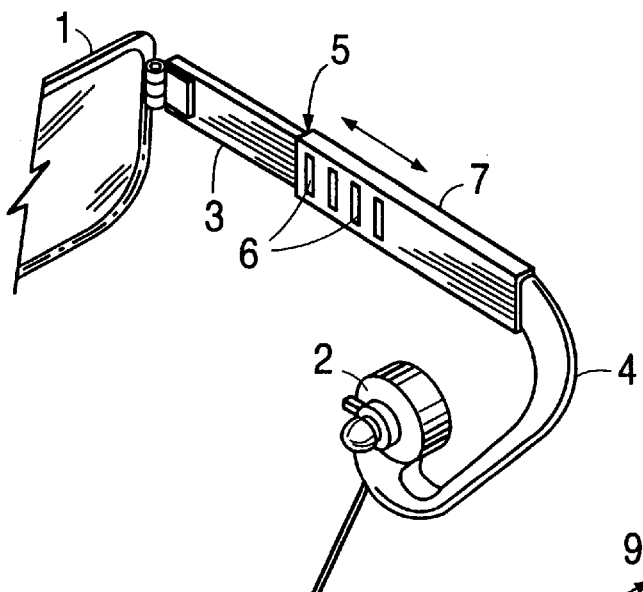
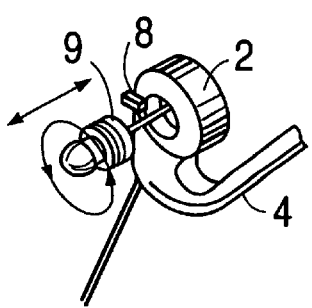

HEADPHONE EYEGLASSES

FIELD OF THE INVENTION

The present invention relates to the field of headphones, and more particularly is directed to a headphone which can be fitted onto a pair of eyeglasses, providing comfort to the wearer of the combination, and allowing the headphones to fit closely to the ear, preventing sound from escaping to the outside to thereby improve acoustic characteristics thereof. The invention also is directed toward eliminating the physical interference and discomfort normally caused when headphones are worn with eyeglasses.

BACKGROUND OF THE INVENTION

Since their introduction, headphones for stereos, portable stereos, and other electronic listening equipment have become increasingly popular and diverse. Such headphones allow a listener to privately hear music, news, or other sounds, while participating in many activities at home and away from home.

Headphones have been diversified in shape and function as a result of many problems that wearers encountered as they attempted to listen to the headphones while performing various activities. For instance, conventional headphones which wrap over a listener's head with a resilient headband cause discomfort and interference, especially when the listener is wearing any type of eyeglasses, a hat or helmet, or other headgear. In response to this problem, headphones which do not have headbands, but rather have housing members which snugly fit into the cavum concha in an auricles of a listener's ears have been developed. The snug fit allows the listener to wear various headgear while listening to the headphones.

The housings of the above headphones are normally flat and cylindrically shaped. Because the headphones do not include a supportive headband, the housings tend to fall out of the wearer's ear. To avoid this, the wearer may need to tightly press the headphones into the auricles of his or her ears. As a result, the wearer unavoidably feels physical discomfort. The listener is therefore unable to listen to the headphones for a very long time.

Accordingly, there is a need in the art for headphones which a listener utilizes while wearing headgear such as eyeglasses. Additionally, there is a need for headphones which allow a listener to listen to headphones for a long time without experiencing discomfort. There is also a need in the art for headphones which allow a listener to be very mobile without having the headphones fall away from the listener's ears or off of the listener's head.

SUMMARY OF THE INVENTION

It is an object of the present invention to meet the above-described needs and others. Specifically, it is an object of the present invention to provide headphones which can be mounted to, or detachably connected to a pair of eyeglasses.

To achieve these objects and others, an exemplary embodiment of the present invention may comprise a pair of eyeglasses, a single headphone or a pair of headphones, and a connective device for connecting the headphone or headphones with the eyeglasses.

The eyeglasses must have arms which hold the eyeglasses on a person's head, and the arms may have earpieces which curve over the top of a wearer's ear. The arms of the eyeglasses may include several notches. The notches would allow a wearer to adjust the connective device so the headphone may fit against the ear, or inside the auricle of the ear, comfortably. The eyeglasses may also have one or more hinges which allow the eyeglasses to fold for compact storage when they are not in use.

The headphones may be small enough to fit into the cavum concha in the auricle of the listener's ear. Each headphone may also have a housing shaped to provide a close fit within the cavum concha in the auricle of each of the listener's ears. Alternatively, the housing may be large enough to be held firmly against the ear without entering the auricle of the ear, if the listener prefers this type of headphone. Each headphone may receive a signal through a cord, and have an accommodating portion leading the cord from the outside of the housing to the inside of the housing. Each headphone may alternatively receive a wave signal through a wave signal receiver means, and comprise means for controlling the signal or volume.

The connective device may be mounted on one of the arms of the eyeglasses, with means for accommodating a headphone. The means for accommodating one of the headphones may comprise a movable portion which allows the wearer to move the headphone to a comfortable position relative to the wearer's ear.

Alternatively, the connective device may be mounted on one of said earphones with means for accommodating one of the arms of the eyeglasses. The means for accommodating one of the arms of the sunglasses may be a molding which slips partly or completely around a part of the arm of the sunglasses. The housing may be secured at one point on the arm of the sunglasses, so that the headphone does not slide or otherwise move on the arm.

The present invention also encompasses a method of using an eyeglasses-headphones combination, which includes: providing a headphone, providing a pair of eyeglasses, providing means for connecting the eyeglasses and the headphone, and assembling the headphone, eyeglasses and connective means so a person can actively and comfortably wear the eyeglasses and listen to the headphones simultaneously. The method may also be used with two headphones. The headphones, eyeglasses, and connective means may have any of the features described above and throughout the specification.

BRIEF DESCRIPTION OF THE DRAWINGS

FIG. 1 shows a side view of one embodiment the headphone eyeglass combination as the combination may appear on a wearer's head.

FIG. 2 shows a cutaway side view of half of the interior surfaces of the eyeglasses, in combination with a headphone.

FIG. 3 shows an interior view of a headphone connected to the end of the earpiece.

FIG. 4 shows a front view of one embodiment of the headphone eyeglass combination as the combination may appear on a wearer's head.

DETAILED DESCRIPTION OF THE INVENTION

Figure 5:
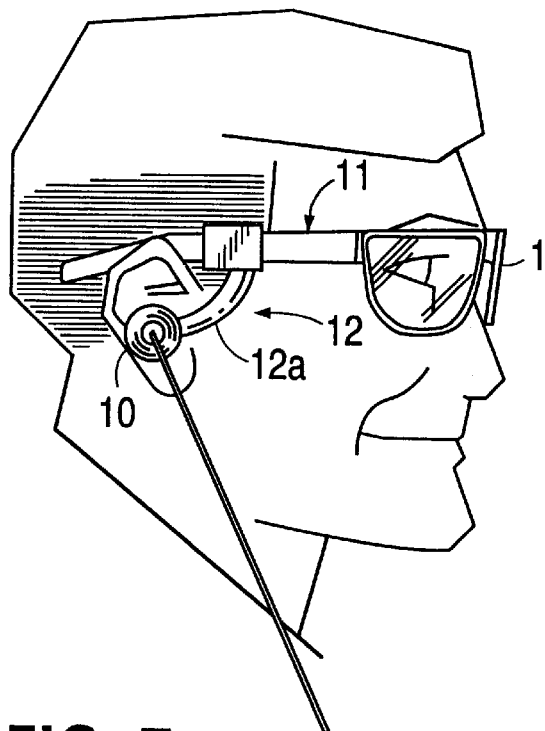
FIG. 5 shows a side view of another embodiment of the headphone eyeglass combination as the combination may appear on a wearer's head.
Figure 6:
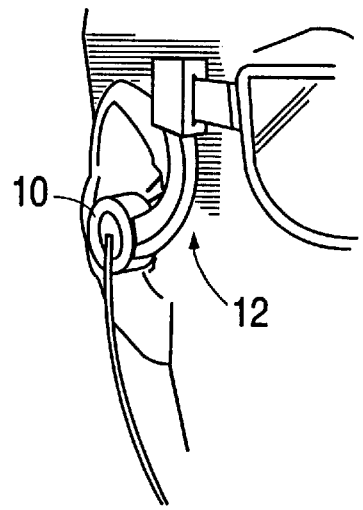
FIG. 6 shows a front view of the embodiment of FIG. 5 as the combination may appear on a wearer's head.

The present invention will be understood more fully from the detailed description given herebelow and from the accompanying drawings of embodiments of the invention. However, the drawings are not intended to imply limitation of the invention to a specific embodiment, but are for explanation and understanding only.

In FIG. 1, eyeglasses 1 may be worn as any conventional eyeglasses are worn, resting on a wearer's nose and ears. A headphone 2 may be attached to the earpiece 4 located as part of the arm 3 of the eyeglasses 1. A headphone 2 may also be positioned at other locations on the arm 3 of the eyeglasses 1, as will be shown in FIGS. 5 to 8.

In FIG. 2, an arm 3 of the eyeglasses 1 may include means 5 for adjusting the length of the arm 3. The means 5 for adjusting the length of the arm 3 is desirable, as the wearer of the combination may want to adjust the position of the headphone 2 relative to the ear without dissembling the combination. Such means 5 may consist of a sleeve 7 which houses a part of the arm 3. The sleeve 7 would house a small amount of the arm 3 if a wearer desires the arm to be very long. The sleeve 7 could also house more of the arm 3 if the wearer desires the arm to be smaller. The arm 3 may contain notches (not shown) which in one aspect may combine with holes 6 in the sleeve 7 to stabilize the arm length. In another embodiment (not shown), the notches may be used to maintain the position of a headphone relative to the ear.

In another aspect of the invention, the earpiece 4, including the sleeve 7, may detach completely from the arm 3. The sleeve 7 may comprise a flexible material having a high coefficient of friction, either forming the entire sleeve or a part thereof. Such material allows the sleeve 7 to form around the arms of various eyeglasses. For instance, a person who wishes to listen to the headphones may do so in combination with his or her eyeglasses, and then later remove the earpiece-headphone combination and attach the combination to his or her sunglasses.

As shown in FIG. 3, a headphone 2 may be permanently attached to the earpiece 4 using bonding means or welding means. The headphone 2 may also be detachable from the earpiece 4. FIG. 3 shows a small clip 8 which may be used to attach the headphone 2 to the earpiece 4. There are many other possible means of attaching the headphone to the sunglasses, including but not limited to snaps, sliding devices, hooks, or fitted sleeves.

Additionally, the headphone or the connective means may include means for adjusting the position of the headphone relative to the ear 9. The headphone 2 may be moved closer to the ear or away from the ear. The adjusting means 9 may also allow the headphone 2 to move vertically and horizontally using, for example, a ball and socket device, additional hinges, or by providing the adjusting means having flexible material.

Another embodiment of the invention is shown in FIG. 5. Eyeglasses 1 may be worn as any conventional eyeglasses are worn, resting on a wearer's nose and ears. A headphone 10 may be attached to the arm 11 of the eyeglasses 1 above the wearer's ear. The headphone may also be positioned at other locations on the arm 11 of the eyeglasses 1.

Figure 7:
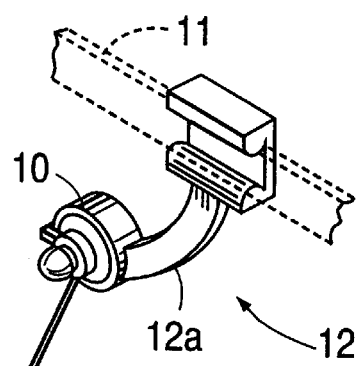
FIG. 7 shows a cutaway side view of the interior half of an eyeglasses arm, in combination with a headphone.

In FIG. 7 a headphone 10 is attached to the arm 11 using connective means 12. The headphone 10, arm 11, and connective means 12 may be an undetachable unit.

In another aspect of the invention, the connective means 12, may detach completely from the arm 11, the headphone 10, or both. The connective means 12 may comprise a flexible material. Such material allows the connective means 12 to form around the arms of various eyeglasses. For instance, a person who wishes to listen to the headphones may do so in combination with his or her eyeglasses, and then later remove the connective means in combination with the earphone, and attach the combination to his or her sunglasses.

The arm may contain notches (not shown) which in one aspect may combine with holes (not shown) in the connective means to stabilize the position of the connective means. In another aspect, the notches may be used to maintain the position of a headphone relative to the ear. The connective means 12 may slide horizontally on the arm 11 of the eyeglasses to allow a comfortable fit of the headphone 10 with the wearer's ear. The connective means 12 may also comprise an adjustable arm 12a which is horizontally, vertically, or rotatably adjustable to further provide a comfortable fit.

Figure 8:
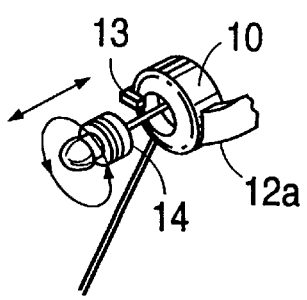
FIG. 8 shows an interior view of a headphone connected to the end of the connective device.

As shown in FIG. 8 a headphone 10 may be attached to the connective device 12 using, for example, bonding means or welding means. The headphone 10 may also be detachable from the connective means 12. FIG. 8 shows a small clip 13 which may be used to attach the headphone 10 to the connective device 12. There are many other possible means of attaching the headphone 10 to the connective device 12, including but not limited to snaps, sliding devices, hooks, or fitted sleeves.

Additionally, the headphone 10 or the connective means 12 may include means for adjusting the position of the headphone relative to the ear 14. The headphone 10 may be moved closer to the ear or away from the ear. The adjusting means 14 may also allow the headphone 10 to move vertically and horizontally using, for example, a ball and socket device, additional hinges, or by providing the adjusting means having flexible material.

Figure 9:
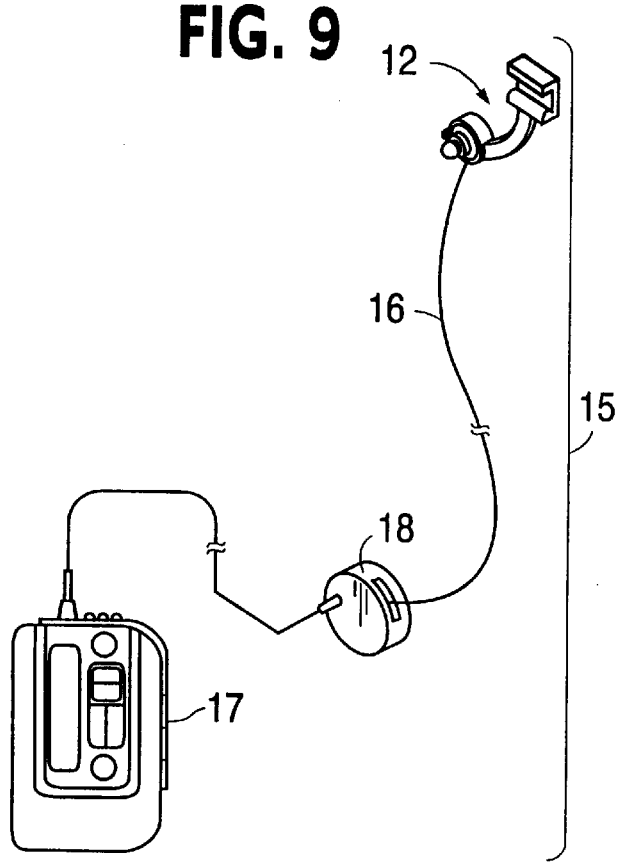
FIG. 9 shows a combination including a cord that supplies an electrical signal to at least one headphone, means for winding the cord, and a signal transmitter such as a radio, cassette player, compact disk player, or DAT player.

FIG. 9 shows a combination 15 including a cord 16 that supplies an electrical signal to at least one headphone, means for winding the cord 18, and a signal transmitter 17 such as a radio, cassette player, compact disk player, or DAT player. The means for winding the cord 18 include a housing 18 for storing the cord 16 when it is not in use, or for containing excess cord when the cord is in use. The cord 16 may be detached at least from the signal transmitter 17 and wound in the housing 18 for storage. The combination 15 also allows a wearer of the headphone eyeglasses combination to store excess cord 16 in the housing during use. The transmitter and the winding means may be clipped to a belt or otherwise kept from hanging loosely during use without requiring the wearer of the combination to hold both parts in his or her hands.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A headphone and eyeglasses combination, comprising:

at least one headphone;

eyeglasses, said eyeglasses including arms, wherein each of said arms comprise two ends;

means for connecting said at least one headphone and said arms of the eyeglasses, including a connection portion which connects to one of said arms, and an extension portion which connects said headphone to said connection portion; and means for adjusting the position of said at least one headphone relative to said extension portion, wherein said adjusting means allows said headphone to move three dimensionally relative to a fixed position of said extension portion.

2. The combination of claim 1, wherein at least one of said arms comprises an earpiece, said earpiece having a curving portion which curves over the top of a wearer's ear.

3. The combination of claim 1, wherein said eyeglasses further comprise means for folding said eyeglasses for compact storage.

4. The combination of claim 3, wherein said folding means comprise at least one hinge included as part of said arms.

5. The combination of claim 1, wherein said eyeglasses further comprise means for adjusting the length of said arms.

6. The combination of claim 1, wherein said headphones are formed to fit within the auricle of a wearer's ear.

7. The combination of claim 1, wherein said headphones are held against the outside of a wearer's ear without entering the auricle of the ear.

8. The combination of claim 1, further comprising a cord, said cord supplying an electrical signal to said at least one headphone.

9. The combination of claim 8, further comprising means for winding said cord, said winding means comprising a housing for storing said cord when said cord is not in use, or for containing excess cord when said cord is in use.

10. The combination of claim 1, wherein said connecting means is undetachably connected to at least one of said arms.

11. The combination of claim 1, wherein said connecting means is undetachably connected to said at least one headphone.

12. A method of using eyeglasses and at least one headphone in combination, comprising the steps of:

providing at least one headphone;

providing eyeglasses, said eyeglasses including arms, wherein each of said arms comprise two ends;

providing means for connecting said at least one headphone and said arms of the eyeglasses, including a connection portion which connects to one of said arms, and an extension portion which connects said headphone to said connection portion;

providing means for adjusting the position of said at least one headphone relative to said extension portion, wherein said adjusting means allows said headphone to move three dimensionally relative to a fixed position of said extension portion;

assembling said at least one headphone, and said eyeglasses, using said connecting means; and wearing said assembled combination of at least one headphone, eyeglasses, and connecting means.

13. The method of claim 12, wherein at least one of said arms comprises an earpiece, said earpiece having a curving portion which curves over the top of a wearer's ear.

14. The method of claim 12, wherein said eyeglasses further comprise means for folding said eyeglasses for compact storage.

15. The method of claim 14, wherein said folding means comprise at least one hinge located between the ends of said arms.

16. The method of claim 12, wherein said eyeglasses further comprise means for adjusting the distance between the ends of said arms.

17. The method of claim 12, wherein said headphones are formed to fit within the auricle of a wearer's ear.

18. The method of claim 12, wherein said headphones are held against the outside of a wearer's ear without entering the auricle of the ear.

19. The method of claim 12, wherein said connecting means is undetachably connected to at least one of said arms.

20. The method of claim 12, wherein said connecting means is undetachably connected to said at least one headphone.

* * * * *